(12) United States Patent
Oh et al.

(10) Patent No.: US 6,432,154 B2
(45) Date of Patent: Aug. 13, 2002

(54) CYCLONE DUST COLLECTING APPARATUS FOR A VACUUM CLEANER

(75) Inventors: Jang-keun Oh; Jong-dal Kim, both of Kwangju (KR)

(73) Assignee: Samsung Kwangju Electronics Co., Ltd., Kwangu (KR)

( * ) Notice: Subject to any disclaimer, the term of this patent is extended or adjusted under 35 U.S.C. 154(b) by 8 days.

(21) Appl. No.: 09/755,557

(22) Filed: Jan. 4, 2001

(30) Foreign Application Priority Data

Jul. 26, 2000 (KR) .......................... 2000-43197

(51) Int. Cl.[7] .......................... B01D 45/12; B01D 35/30
(52) U.S. Cl. .......................... 55/423; 55/424; 55/428; 55/459.1; 55/DIG. 3
(58) Field of Search .................. 15/350, 353; 55/423, 55/424, 428, 459.1, DIG. 3

(56) References Cited

U.S. PATENT DOCUMENTS

| | | | |
|---|---|---|---|
| 2,802,545 A | | 8/1957 | Heinrich et al. ............ 183/76 |
| 3,426,513 A | * | 2/1969 | Bauer ........................ 209/719 |
| 3,990,976 A | | 11/1976 | Nishioka .................... 210/512 |
| 4,853,011 A | | 8/1989 | Dyson ........................ 55/345 |
| 4,996,538 A | | 2/1991 | Brecy et al. ............... 346/74.3 |
| 5,525,396 A | * | 6/1996 | Rudolph et al. ............ 428/131 |
| 5,935,279 A | * | 8/1999 | Kilstrom .................... 15/350 |
| 6,228,151 B1 | * | 5/2001 | Conrad et al. ............. 55/424 |

FOREIGN PATENT DOCUMENTS

| | | |
|---|---|---|
| DE | 849 950 | 9/1952 ........... 50/310 |
| DE | 38 15 086 | 8/1989 |
| DE | 199 45 403 | 6/2000 |
| EP | 0 966 912 | 12/1999 |
| WO | WO 95/16382 | 6/1995 |
| WO | WO 99/34722 | 7/1999 |

OTHER PUBLICATIONS

Search Report issued Mar. 22, 2001 by the Dutch Industrial Property Office with respect to corresponding Dutch Patent Application No. 1017219.

* cited by examiner

*Primary Examiner*—Robert A. Hopkins
(74) *Attorney, Agent, or Firm*—Ladas & Parry

(57) ABSTRACT

A cyclone dust collecting apparatus for a vacuum cleaner includes a hollow cylindrical cyclone body having an open upper end through which air and contaminants are drawn in and a dust discharge port located proximate a lower end of the cyclone body. The dust discharge port receives contaminants that have been separated from the air by centrifugal force and discharged from the cyclone body. The apparatus further includes a dust receptacle connected to the cyclone body for collecting the contaminants discharged from the cyclone body through the dust discharge port. A base member is connected to and closes the lower end of the cyclone body and the dust receptacle, and a cover is removably connected to the upper end of the cyclone body and the dust receptacle. The cover has an air intake channel for drawing in outside air and contaminants into the cyclone body and an air discharge channel for discharging clean air from the cyclone body. The apparatus further includes a backflow prevention means for guiding contaminants that have been discharged from the cyclone body into the dust receptacle and preventing a backflow of the contaminants collected in the dust receptacle from returning to the cyclone body.

7 Claims, 3 Drawing Sheets

CYCLONE DUST COLLECTING APPARATUS FOR A VACUUM CLEANER

BACKGROUND OF THE INVENTION

1. Field of the Invention

This invention relates to a vacuum cleaner, and more particularly, to a cyclone dust collecting apparatus for the vacuum cleaner for centrifuging and collecting contaminants entrained in sucked air.

2. Description of the Related Art

Generally, a vacuum cleaner includes a suction brush movably connected to a cleaner body, which moves along the cleaning surface during the cleaning process. The cleaner body has a dust collecting chamber with a detachable dust filter disposed inside, and a motor operating chamber including a motor for generating a suction force. When the motor operates, it generates a strong suction force at the suction brush. Accordingly, contaminants, such as dust or dirt, on the cleaning surface are drawn in together with air into the cleaner body. The contaminants entrained in the air are filtered through a dust filter disposed in the dust collecting chamber of the cleaner body, and the clean air is discharged back into the environment through the motor operating chamber.

A conventional vacuum cleaner collects contaminants by using an expendable dust filter. When the dust filter is filled with contaminants, the dust filter must be replaced manually. Replacing the dust filter manually is inconvenient and results in poor sanitation conditions.

SUMMARY OF THE INVENTION

The present invention has been made to overcome the above-mentioned problems of the related art. Accordingly, it is an object of the present invention to provide a cyclone dust collecting apparatus for a vacuum cleaner for centrifuging and collecting contaminants entrained in the air that is sucked into the vacuum cleaner through a suction brush.

The above object is accomplished by providing a cyclone dust collecting apparatus for the vacuum cleaner including a hollow cylindrical cyclone body having open upper and lower ends, and a dust discharge port located proximate the lower end for receiving contaminants that are separated from the air by centrifugal force and discharged from the cyclone body. The apparatus further includes a dust receptacle connected to the cyclone body. The dust receptacle collects the contaminants from the cyclone body through the dust discharge port. A base member is connected to and closes the lower end of the cyclone body and the dust receptacle, and a cover is removably connected to the upper end of the cyclone body and the dust receptacle. The cover has an air intake channel for drawing outside air and contaminants into the cyclone body and an air discharge channel for discharging clean air from the cyclone body. The apparatus further includes a backflow prevention means for guiding contaminants that are discharged from the cyclone body into the dust receptacle and preventing a backflow of the contaminants collected in the dust receptacle from returning to the cyclone body.

BRIEF DESCRIPTION OF THE DRAWINGS

The above object and other features of the present invention will be clarified by the following description with the attached drawings, in which.

DETAILED DESCRIPTION OF THE PREFERRED EMBODIMENT

This invention of a cyclone dust collecting apparatus will be described in further detail by way of example with reference to the attached drawings.

Figure 1:
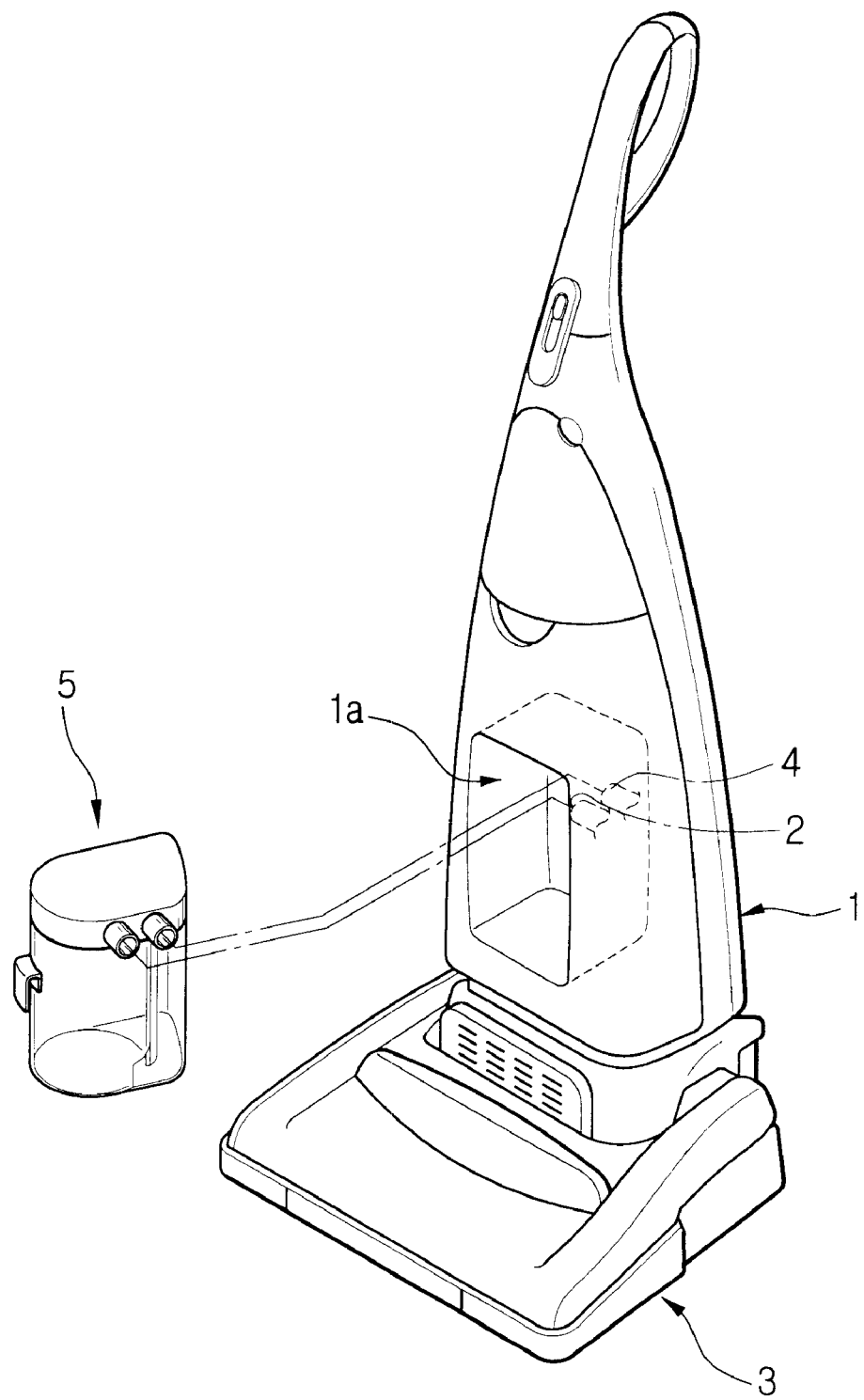
FIG. 1 is a perspective view schematically showing a vacuum cleaner having a cyclone dust collecting device according to a preferred embodiment of the present invention.

FIG. 1 is a perspective view showing a vacuum cleaner having a cyclone dust collecting device in accordance with a preferred embodiment of the present invention.

Referring to FIG. 1, the vacuum cleaner includes a cleaner body 1, a suction brush 3 movably connected to the cleaner body 1, and a cyclone dust collecting device 5.

The cleaner body 1 has a dust collecting chamber 1a in which the cyclone dust collecting device 5 is placed, and a motor operating chamber (not shown) in which a motor is installed. The motor operating chamber is disposed under the dust collecting chamber 1a and communicates via a discharge pipe 4 with the dust collecting chamber 1a. The motor (not shown) generates a strong suction force that enables the suction brush 3 to draw in contaminants on the cleaning surface. The suction brush 3 is connected via a suction pipe 2 to the dust collecting device 5 in the dust collecting chamber 1a.

Figure 2:
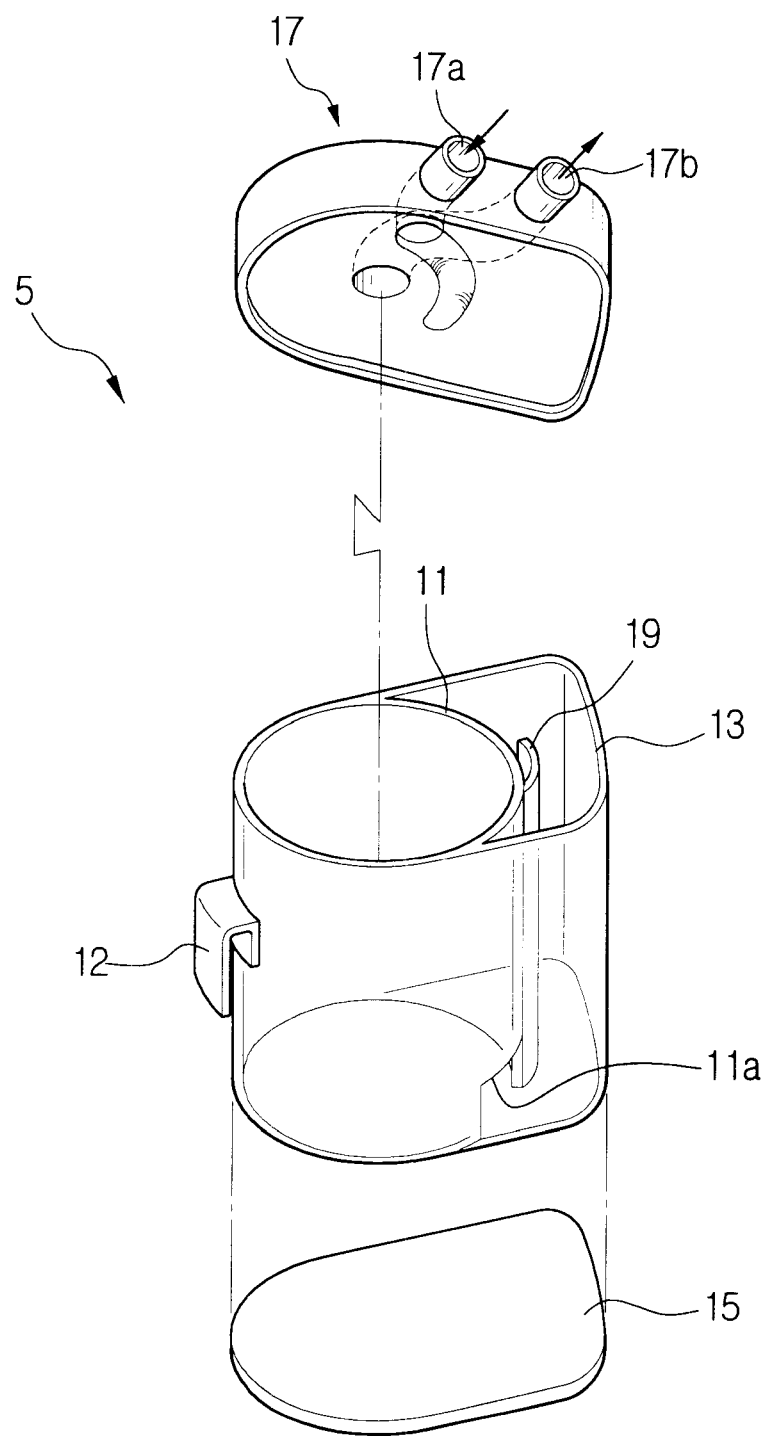
FIG. 2 is a perspective view schematically showing the cyclone dust collecting device from FIG. 1.
Figure 3:
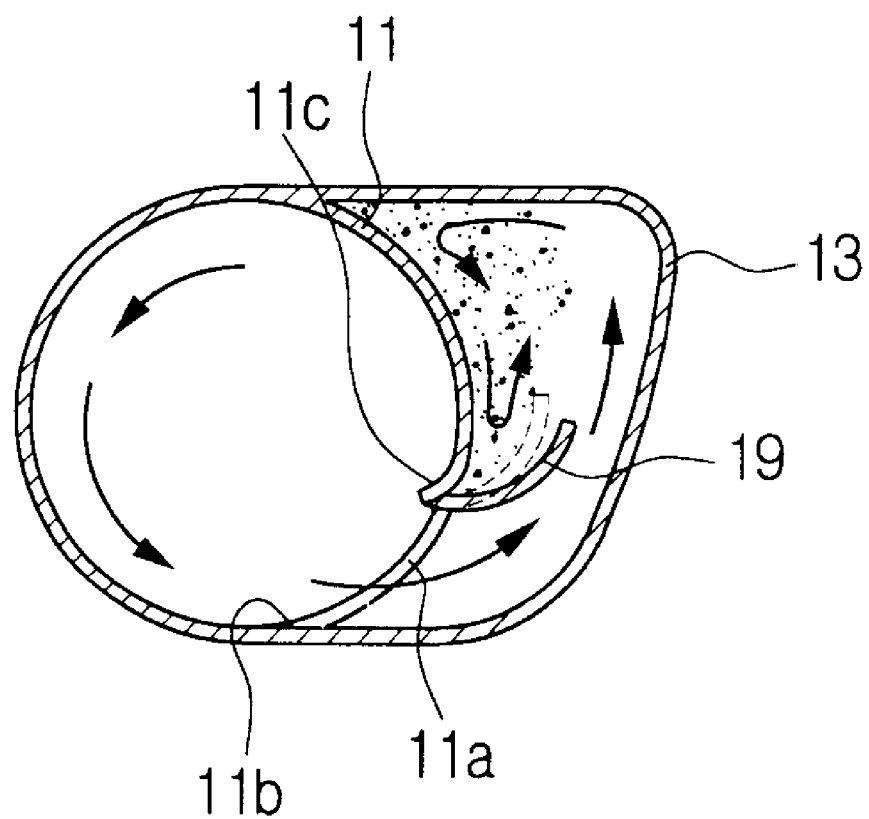
FIG. 3 is a plan view showing a cyclone body and a dust receptacle of the cyclone dust collecting device from FIG. 2.

The cyclone dust collecting device 5 centrifuges and collects contaminants drawn in with the air through the suction brush 3. The cyclone dust collecting device 5 is detachably placed in the dust collecting chamber 1a. As shown in FIGS. 2 and 3, the cyclone dust collecting device 5 includes a cyclone body 11, a dust receptacle 13, a base member 15, a cover 17, and a backflow prevention means.

The cyclone body 11 is a hollow cylinder with open upper and lower ends. The cyclone body 11 has a predetermined inner diameter, and a dust discharge port 11a of a predetermined size. Air and contaminants drawn in through the suction brush 3 enter the upper end of the cyclone body, where they are induced into a vortex and separated by centrifugation. The contaminants are then discharged through the dust discharge port 11a. Outlines 11b and 11c of the dust discharge port 11a have different radiuses of curvature from the radius of curvature of the cyclone body 11. The radius of curvature of the soft outline 11b that extends to the dust receptacle 13 is greater than the radius of curvature of the cyclone body 11, thereby effectively guiding contaminants in a direction toward the dust receptacle 13. The radius of curvature of the bent outline 11c is less than the radius of curvature of the cyclone body 11, thereby enlarging the outlet to effectively guide as many contaminants as possible through the dust discharge port 11a.

Contaminants discharged from the cyclone body 11 through the dust discharge port 11a are collected and placed in the dust receptacle 13, which is located adjacent to the cyclone body 11. The dust receptacle 13 surrounds a portion of the cyclone body 11. More specifically, the hollow cylindrical dust receptacle 13 is preferably integrally formed with the cyclone body 11 and has a height identical to that of the cyclone body 11. The cyclone body 11 and the dust receptacle 13 communicate with each other through the dust discharge port 11a. The dust receptacle 13 is formed from the extended soft outline 11b in the cyclone body 11.

The base member 15 of the cyclone dust collecting device 5 is connected to and closes the lower end of both the cyclone body 11 and the dust receptacle 13. The base member 15 is preferably integrally formed with the cyclone body 11 and the dust receptacle 13.

The cover 17 is removably coupled to and covers the upper end of both the cyclone body 11 and the dust receptacle 13. The cover 17 includes an air intake channel 17a and an air discharge channel 17b, both of which communicate with the cyclone body 11. The air intake channel 17a is connected to the suction pipe 2, which draws air and contaminants through the suction brush 3. The air intake channel 17a extends toward, but is offset from, the center of the upper end of the cyclone body 11, as illustrated in FIG. 2, in order to induce the air that is brought into the cyclone body 11 into a vortex. The air discharge channel 17b extends from approximately the center of the cover 11 to a side of the cover. The air discharge channel 17b is connected to the discharge pipe 4 and communicates with the motor operating chamber. The air discharge channel 17b discharges clean air that has been centrifuged and separated from the contaminants back into the environment.

The backflow prevention means of the dust collecting device 5 retains the contaminants that are discharged from the cyclone body 11 in the dust receptacle 13 and prevents the collected contaminants from returning to the cyclone body 11. The backflow prevention device includes a guide member 19 that extends from an outline of the dust discharge port 11a inward to the dust receptacle 13. As shown in FIG. 3, the guide member 19 is disposed at an acute angle with respect to the outer circumference of the cyclone body 11. In addition, the guide member 19 is disposed adjacent to the bent outline 11c, which is located in the downstream region of the vortex flow. The guide member 19 extends from the cover 17 to the base member 15, in order to prevent backflow along the entire length of the dust receptacle 13. Furthermore, the guide member 19 is preferably made of an elastic material, such as a film that is flexible under a discharge pressure from the dust discharge port 11a. The guide member 19 is attached using an adhesive, such as a bond, to the outside of the cyclone body 11 proximate the dust discharge port 11a. The guide member 19 has a certain radius of curvature that corresponds to the outer circumference of the cyclone body 11. Consequently, the radius of curvature of the guide member 19 enables effective guiding of the contaminants discharged from the dust discharge port 11a into the dust receptacle 13 and prevents the backflow of the collected contaminants into the cyclone body 11 by preventing reverse deformation of the guide member 19.

The cyclone dust collecting device 5 further includes a handle 12 that is formed on the outer surface of the cyclone body 11, as shown in FIG. 2.

The operation of the cyclone dust collecting apparatus of the present invention will be described hereinafter:

When the vacuum cleaner is operating, a strong suction force is generated at the suction brush 3. Contaminants on the cleaning surface are drawn in along with air through the suction brush 3 and into the cyclone body 11, through the suction pipe 2 and the air intake channel 17a. The sucked air is introduced diagonally by the air intake channel 1 7a into the cyclone body 11 and subjected to a vortex flow, as indicated by the arrows in FIG. 3. The contaminants descend along the interior of the cyclone body 11. The centrifugal force of the vortex separates the contaminants from the air, and the contaminants are ejected through the dust discharge port 11a into the dust receptacle 13. As the contaminants are collected in the dust receptacle 13, they pile up behind the guide member 19. The collected contaminants in the dust receptacle 13 move within the dust receptacle 13 in a turbulent manner due to the discharge pressure, however, the guide member 19 blocks the path to prevent the contaminants from returning to the cyclone body 11 through the dust discharge port 11a.

Clean air, which has been separated from the contaminants, is discharged through the air discharge channel 17b, the discharging pipe 4, the motor operating chamber of the cleaner body 1, and outlets (not shown) into the environment.

When the dust receptacle 13 is full, the cyclone dust collecting device 5 can be removed from the dust collecting chamber 1a of the cleaner body 1. The cover 17 of the dust collecting device 5 is then detached from the cyclone body 11 and the dust receptacle 13, and the contaminants collected in the dust receptacle 13 may be dumped out.

The above-described preferred embodiment of the present invention is for an upright-type vacuum cleaner. However, the cyclone dust collecting device 5 can also be applied to a canister-type vacuum cleaner, which is not shown in the drawings.

As described above in detail, the cyclone dust collecting device for a vacuum cleaner includes a guide member adjacent to the dust discharge port formed in the cyclone body. The guide member effectively directs contaminants through the dust discharge port and into the dust receptacle and prevents the backflow of contaminants into the cyclone body. Thus, the cyclone dust collecting device of the present invention increases the efficiency and performance of the vacuum cleaner.

What is claimed is:

1. A cyclone dust collecting apparatus for a vacuum cleaner comprising:

a hollow cylindrical cyclone body having a predetermined height and an open upper end through which air and contaminants are drawn in and a dust discharge port, the dust discharge port being located proximate a lower end of the cyclone body, the dust discharge port allowing contaminants that have been separated from the air by centrifugation to pass therethrough;

a dust receptacle connected to the cyclone body for collecting contaminants discharged from the cyclone body through the dust discharge port;

a base member connected to and closing the lower end of the cyclone body and the dust the dust receptacle;

a cover removably connected to the upper end of the cyclone body and the dust receptacle, the cover including an air intake channel through which outside air and contaminants are drawn into the cyclone body, and an air discharge channel through which air in the cyclone body is discharged; and a backflow prevention means, formed in an outline of the dust discharge port and having a height identical to the height of the cyclone body, for guiding contaminants discharged from the cyclone body to the dust receptacle and preventing a backflow of the contaminants collected in the dust receptacle from returning to the cyclone body.

2. The apparatus claimed in claim 1, wherein the dust receptacle is integrally formed with the cyclone body.

3. A cyclone dust collecting apparatus for a vacuum cleaner comprising:

a hollow cylindrical cyclone body having an open upper end through which air and contaminants are drawn in and a dust discharge port, the dust discharge port being located proximate a lower end of the cyclone body, the dust discharge port allowing contaminants that have been separated from the air by centrifugation to pass through;

a dust receptacle connected to the cyclone body for collecting contaminants discharged from the cyclone body through the dust discharge port;

a base member connected to and closing the lower end of the cyclone body and the dust receptacle;

a cover removably connected to the upper end of the cyclone body and the dust receptacle, the cover including an air intake channel through which outside air and contaminants are drawn into the cyclone body, and an air discharge channel through which air in the cyclone body is discharged; and a backflow prevention means, including a guide member extending from the dust discharge port inward to the dust receptacle, for guiding contaminants discharged from the cyclone body to the dust receptacle and preventing a backflow of the contaminants collected in the dust receptacle from returning to the cyclone body.

4. The apparatus as claimed in claim 3, wherein the guide member is disposed at an acute angle with respect to an outer circumference of the cyclone body.

5. The apparatus as claimed in claim 3, wherein the guide member is disposed in a bent outline placed in the downstream region of the vortex flow.

6. The apparatus claimed in claim 3, wherein the guide member has a radius of curvature that corresponds to an outer circumference of the cyclone body.

7. A cyclone dust collecting apparatus for a vacuum cleaner comprising:

a hollow cylindrical cyclone body having an open upper end through which air and contaminants are drawn in and a dust discharge port, the dust discharge port being located proximate a lower end of the cyclone body, and having outline in which the radiuses of curvature are greater or lesser than the radius of curvature of the cyclone body, the dust discharge port allowing contaminants that have been separated from the air by centrifugation to pass there through;

a dust receptacle connected to the cyclone body for collecting contaminants discharged from the cyclone body through the dust discharge port;

a base member connected to and closing the lower end of the cyclone body and the dust receptacle;

a cover removably connected to the upper end of the cyclone body and the dust receptacle, the cover including an air intake channel through which outside air and contaminants are drawn into the cyclone body, and an air discharge channel through which air in the cyclone body is discharged; and a backflow prevention means for guiding contaminants discharged from the cyclone body to the dust receptacle and preventing a backflow of the contaminants collected in the dust receptacle from returning to the cyclone body.

* * * * *